United States Patent [19]

Ando et al.

[11] Patent Number: 5,239,661
[45] Date of Patent: Aug. 24, 1993

[54] HIERARCHICAL BUS CIRCUIT HAVING DECODER GENERATING LOCAL BUSES AND DEVICES SELECT SIGNALS ENABLING SWITCHING ELEMENTS TO PERFORM DATA TRANSFER OPERATIONS

[75] Inventors: Hideki Ando; Chikako Ikenaga, both of Hyogo, Japan

[73] Assignee: Mitsubishi Denki Kabushiki Kaisha, Tokyo, Japan

[21] Appl. No.: 800,300

[22] Filed: Nov. 29, 1991

Related U.S. Application Data

[62] Division of Ser. No. 567,355, Aug. 14, 1990, Pat. No. 5,093,588.

[30] Foreign Application Priority Data

Aug. 18, 1989 [JP] Japan .......................... 1-213532

[51] Int. Cl.⁵ ............................................. G06F 13/00
[52] U.S. Cl. .................................. 395/800; 307/239;
  307/443; 370/85.1; 370/85.9; 395/775;
  364/240.2; 364/240.7; 364/260.2; 364/DIG. 1
[58] Field of Search ................ 395/800, 775; 207/241,
  207/443, 452; 370/60.1, 85.9, 112

[56] References Cited

U.S. PATENT DOCUMENTS

| 4,154,978 | 5/1979 | Tu ........................ 178/71 R |
| 4,488,066 | 12/1984 | Shoji .................... 307/452 |
| 4,621,202 | 11/1986 | Pumo .................... 307/241 |
| 4,814,970 | 3/1990 | Barbagelata et al. ...... 395/200 |
| 4,870,704 | 9/1989 | Matelon et al. .......... 395/800 |
| 4,918,329 | 4/1990 | Milby et al. ............ 307/241 |
| 4,956,850 | 9/1990 | Balmer .................. 375/3 |
| 4,962,343 | 10/1990 | Nakagawa et al. ......... 307/246 |
| 5,004,937 | 4/1991 | de Oliveira et al. ..... 307/443 |

Primary Examiner—Thomas C. Lee
Assistant Examiner—Alpesh M. Shah
Attorney, Agent, or Firm—Lowe, Price, LeBlanc & Becker

[57] ABSTRACT

A bus circuit of a precharging type has an hierarchical structure comprising a higher rank bus and a plurality of lower rank buses connected in parallel thereto. A register block is connected to each of the lower rank buses, each register block comprising a plurality of registers connected in parallel to the lower rank bus. Both of the higher and the lower rank buses are precharged. The data of the register selected as a bus source is read onto the higher rank bus, thereby fluctuating a potential on the higher rank bus. Only the electric charges on the selected lower rank bus are discharged in response to the potential fluctuation and the selection signal. The total number of the registers coupled to the lower rank buses is the power of 2.

2 Claims, 6 Drawing Sheets

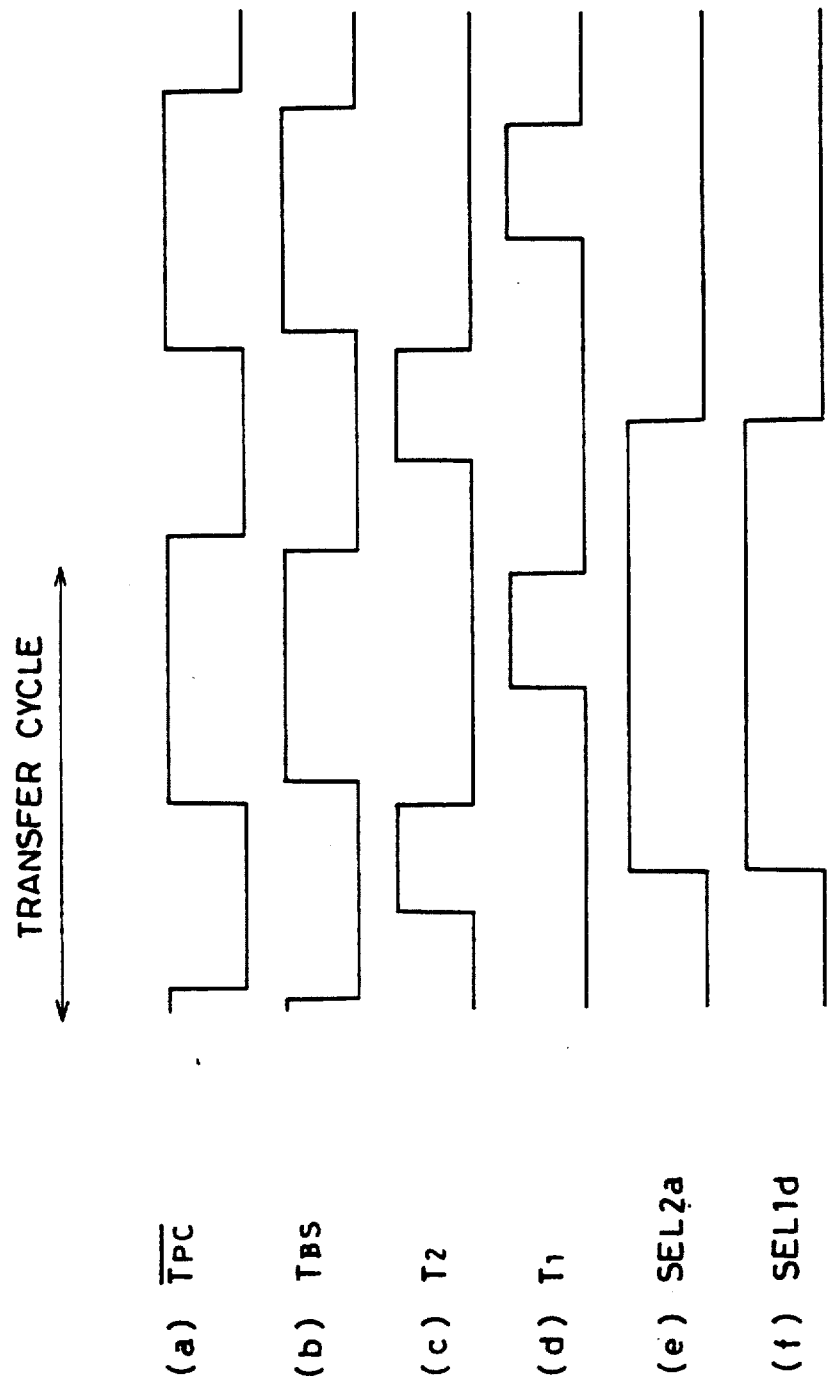

HIERARCHICAL BUS CIRCUIT HAVING DECODER GENERATING LOCAL BUSES AND DEVICES SELECT SIGNALS ENABLING SWITCHING ELEMENTS TO PERFORM DATA TRANSFER OPERATIONS

This application is a division of application Ser. No. 07/567,355 filed Aug. 14, 1990 now U.S. Pat. No. 5,093,588.

CROSS-REFERENCE TO COPENDING APPLICATION

The present application is related to copending application Ser. No. 508,724 filed Apr. 13, 1990 now U.S. Pat. No. 5053642, issued Oct. 1, 1991, commonly assigned to the assignee of the present application.

BACKGROUND OF THE INVENTION

1. Field of the Invention

The present invention relates generally to bus circuits of the precharge type, and more particularly, to improvement of a bus circuit of the precharge type used for transmitting data in a semiconductor integrated circuit such as a microprocessor.

2. Description of the Background Art

FIG. 4 is a schematic block diagram showing one example of a conventional bus circuit of the precharge type used for an integrated circuit device such as a microprocessor. In FIG. 4, connected to a bus interconnection 1 are registers 11a, 11b, 11c and 11d each functioning as bus source and destination, and which registers as a whole constitute a register file 11 of the microprocessor. These registers are for temporarily storing the data for an operation in an ALU (not shown) or the like, and the data is transferred between these registers through the bus interconnection 1 when necessary. The bus interconnection 1 is connected to a power supply 3 through a P channel transistor 2.

Such a transfer operation of the data between the registers is performed by a microinstruction 5 stored in an instruction register 4 constituting a part of the microprocessor. More specifically, a bus destination register selecting instruction 5a in the microinstruction 5 is applied to one decoder 7 constituting a selection signal generating circuit 6, so that the decoder 7 generates signals SEL1a-SEL1d for selecting a register as a bus destination in response to the microinstruction and supplies the same to the registers 11a-11d respectively.

On the other hand, a bus source register selecting instruction 5b in the microinstruction 5 is applied to the other decoder 8 constituting the selection signal generating circuit 6, so that the decoder 8 generates signals SEL2a-SEL2d for selecting a register as a bus source in response to the microinstruction and supplies the same to the registers 11a-11d respectively.

A timing generating circuit 9 generates various timing signals $\overline{T_{PC}}$, $T_{BS}$, $T_1$ and $T_2$ which will be describe later, and the $\overline{T_{PC}}$ is supplied to a gate of the P channel transistor 2 and the $T_{BS}$, $T_1$ and $T_2$ together are supplied in common to each of the registers.

FIG. 5 is a circuit diagram showing in detail the register file 11 shown in FIG. 4, which particularly shows circuit structures of the registers 11a and 11d while those of the registers 11b and 11c are not shown. Since the registers 11a and 11d have completely the same structure in FIG. 5, a description will be given to the structure of the register 11a, but not to that of register 11d.

The register 11a is mainly comprised of a destination latch 12a, a logic circuit 10a, a source latch 13a and a bus driver circuit 14a. The destination latch 12a is for receiving the data transferred from a source register through the bus interconnection 1 and an operation thereof is controlled by a logical product of the timing signal $T_1$ from the timing generating circuit 9 and the signal SEL1a from the decoder 7. The source latch 13a is for holding the data to be transferred to the destination register through the bus interconnection 1 and an operation thereof is controlled by the timing signal $T_2$ from the timing generating circuit 9. The bus driver circuit 14a is comprised of N channel transistors 15a and 16a connected in series between the bus interconnection 1 and a ground, wherein a logical product of the timing signal $T_{BS}$ from the timing generating circuit 9 and the signal SEL2a from the decoder 8 is applied to a gate of the transistor 15a and an output of the source latch 13a is applied to a gate device such as a gate, a memory, an ALU and a CPU.

FIG. 6 is a timing chart for explaining an operation of the bus circuit of the precharge type shown in FIGS. 4 and 5. Now, referring to FIGS. 4 through 6, a description will be given to an operation of a conventional bus circuit of the precharge type, for example, in case the data held in the register 11a is transferred to the register 11d.

First, the precharging P channel transistor 2 is turned on during a period the $\overline{T_{PC}}$ (FIG. 6(a)) generated from the timing generating circuit 9 is at the "L" (logical low) level, whereby current flows from the power supply 3 to the bus interconnection 1 through the transistor 2, so that a potential on the bus interconnection 1 attains the "H" (logical high) level. During this period, the $T_{BS}$ generated from the timing generating circuit 9 remains at the "L" level. Subsequently, when the $\overline{T_{PC}}$ rises to the "H" level, the P channel transistor 2 is turned off but the $T_{BS}$ remains at the "L" level, and the N channel transistor 15a remains off. Accordingly, during the period the $T_{BS}$ is at the "L" level (precharge period), the potential on the bus interconnection 1 remains at the "H" level.

Now considering a case in which the data to be transferred is at the "H" level, a signal held in the latch 13a of the register 11a is at the "H" level. In addition, in this case, since the register 11a is selected as a source for the bus, the selection signal SEL2a supplied from the decoder 8 attains the "H" level (FIG. 6 (a)). Accordingly, when the $\overline{T_{PC}}$ rises to the "H" level followed by the $T_{BS}$ rising to the "H" level, the N channel transistor 15a forming the bus driver circuit 14a is turned on at that time. Since the output of the latch 13a is at the "H" level at that time as described above, the N channel transistor 16a is turned on, and at the same time as the turning on of the transistor 15a, the bus interconnection 1 is connected to the ground potential, so that the potential on the bus interconnection is lowered to the "L" level.

In addition, since the register 11d is selected as a bus destination, the selection signal SEL1d supplied from the decoder 7 attains the "H" level (FIG. 6 (f)). Accordingly, the latch 12d of the register 11d is operated in response to the timing signal $T_1$ from the timing generating circuit 9, whereby the inversion data is taken to the latch 11d *from the bus interconnection 1.*

On the other hand, in case the data to be transferred is at the "L" level, the N channel transistor 16a is not turned on, and therefore no electric charge on the bus interconnection 1 is discharged, so that the potential thereon remains the "H" level. Accordingly, the inversion data is taken from the bus interconnection 1 to the latch 12d of the register 11d in response to the timing signal $T_1$.

However, in the conventional bus circuit of the precharge type comprised of one bus interconnection as described above, if the number of registers as bus source and destination is increased, a length of the bus interconnection is increased, whereby the number of the transistors to be driven is also increased. Consequently, interconnection resistance and load capacitance of the bus are increased, resulting in the increase of the time for discharging electricity from the precharged bus. As a result, a data transferring operation in a microprocessor is delayed, thereby making it impossible to shorten a machine cycle. Therefore, a hierarchical structure of a bus interconnection is proposed comprising first and second buses each including only a single bus, which is disclosed in Japanese Patent Laying Open No. 63-26717. However, the delay in discharging the electricity from the bus can not be prevented completely by such a hierarchical structure in case that there is provided so many registers. In addition, with the hierarchical architecture shown in this reference, a decoding circuit of a microinstruction becomes complicated if the bus is simply divided into some portions and interconnections are provide for respective portions.

SUMMARY OF THE INVENTION

Therefore an object of the present invention is to provide a bus circuit in which speed of data transfer is enhanced without the delay in discharging the electricity from a precharged bus.

Another object of the present invention is to provide a bus circuit in which complication of a decoding circuit of a microinstruction can be avoided even if a bus has a hierarchical structure comprising a high rank bus and a low rank bus.

A bus circuit of the precharge type according to the present invention has a hierarchical bus structure comprising a higher rank bus and a plurality of lower rank buses, such that only the electric charges on selected lower rank buses are discharged in response to the fluctuation of a potential on the higher rank bus.

According to another aspect of the present invention, the total number of registers connected to the lower rank buses is a power of 2.

In a bus circuit according to the present invention, a time period for discharging electricity from a bus and power consumption can be reduced by making a bus to be a hierarchical interconnection to selectively discharging electricity from lower rank buses.

In addition, the complication of a decoding circuit of a microinstruction can be avoided even in a hierarchical bus structure by making the total number of the registers coupled to each of the lower rank buses to be a power of 2.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a timing chart for explaining operations of the conventional bus circuit shown in FIGS. 4 and 5.

DESCRIPTION OF THE PREFERRED EMBODIMENTS

Figure 1:
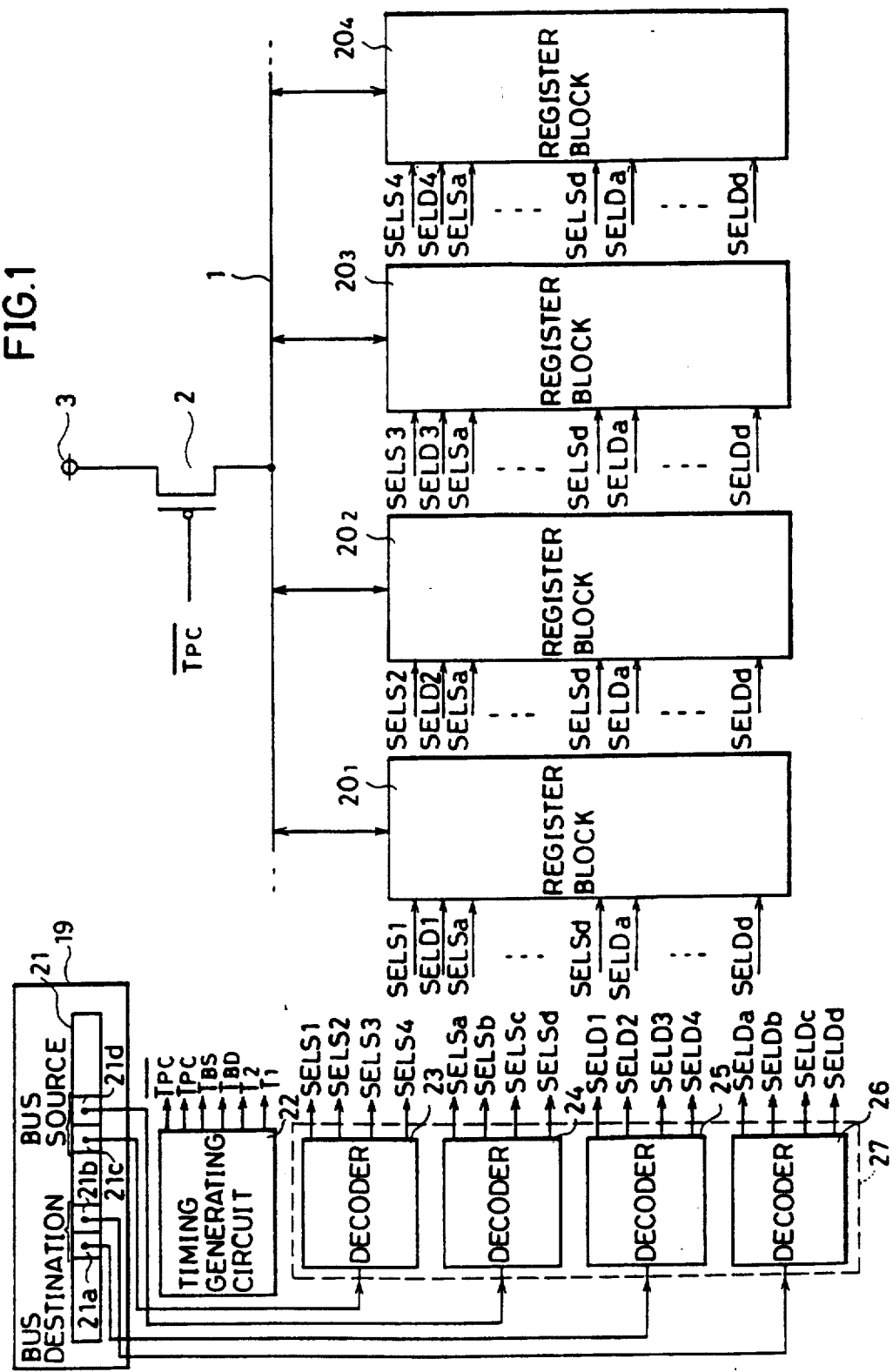
FIG. 1 is a block diagram showing a bus circuit according to one embodiment of the present invention.
Figure 4:
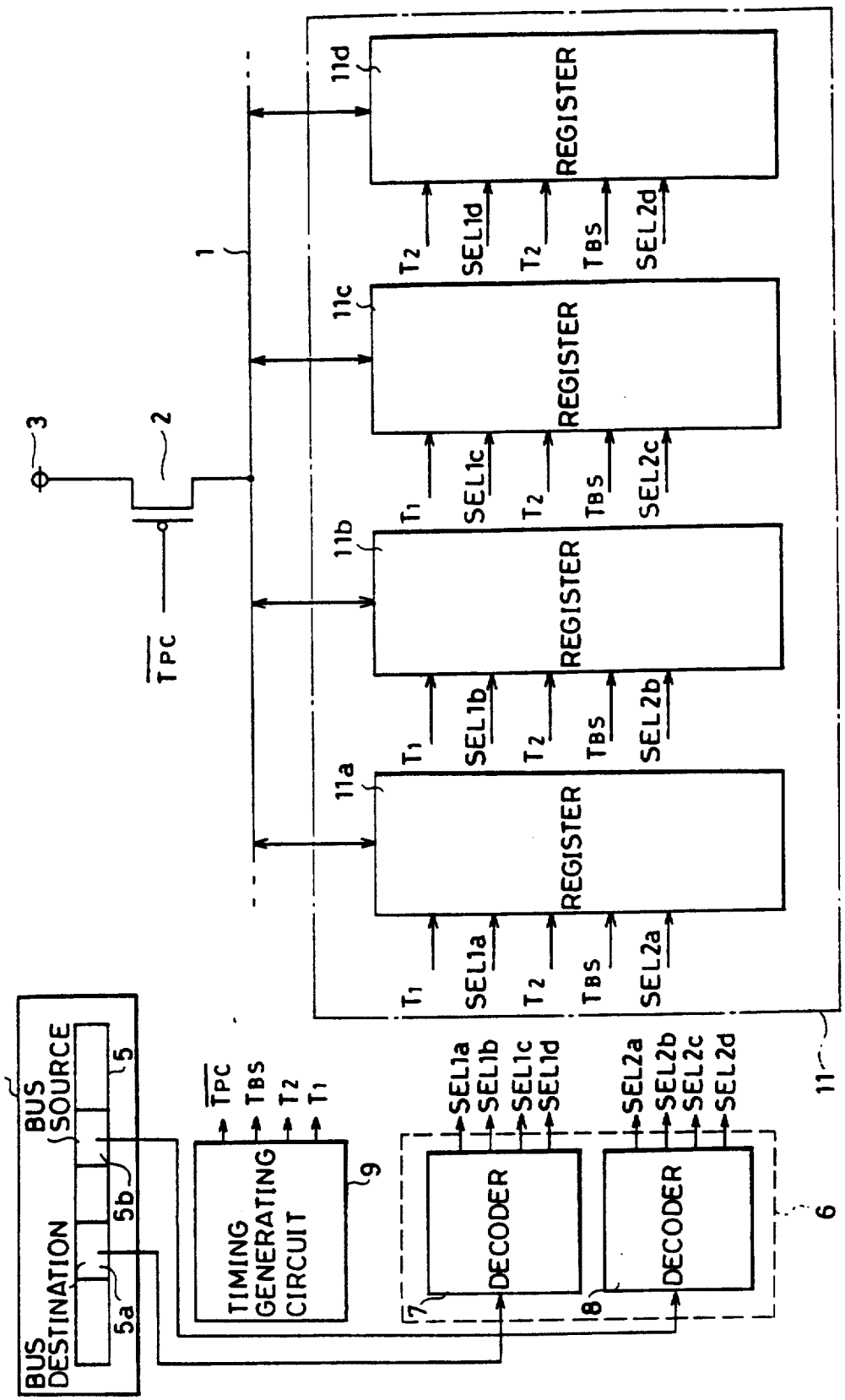
FIG. 4 is a block diagram showing one example of a conventional bus circuit of the precharge type.
Figure 5:
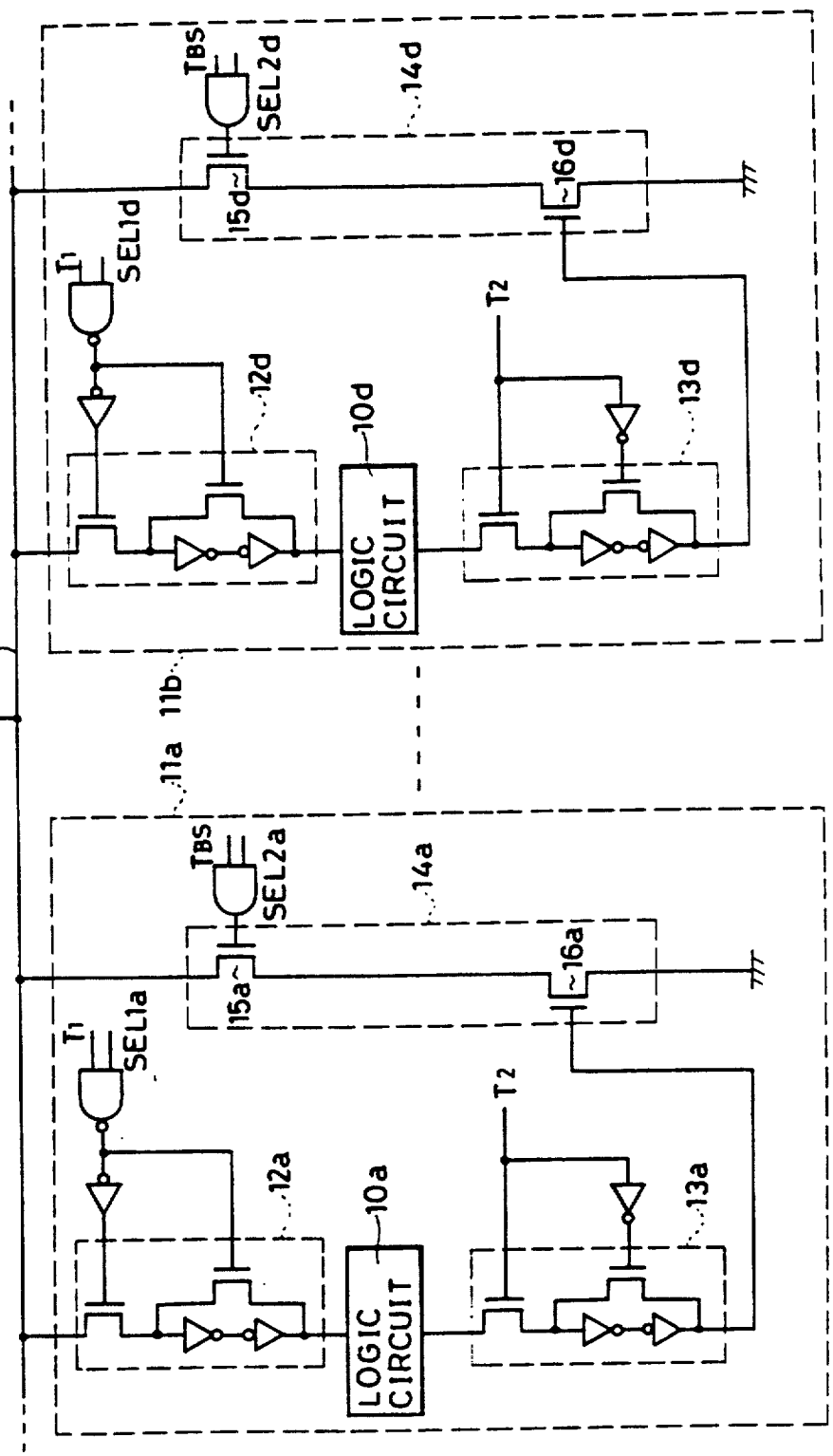
FIG. 5 is a circuit diagram showing in detail a register file, shown in FIG. 4.

Referring to FIG. 1, connected to a main bus interconnection 1 are register blocks $20_1$, $20_2$, $20_3$ and $20_4$ each further comprising a plurality of registers each functioning as bus source and destination. The main bus interconnection 1 is connected to a power supply 3 through a P channel transistor 2 as in the prior art of FIG. 4. The main bus interconnection 1 functions as a higher rank bus.

Data transferring operations between these register blocks or the registers are performed by a microinstruction 21 stored in an instruction register 19. More specifically, a bus destination register block selecting instruction 21a in the microinstruction 21 is applied to a decoder 25 constituting a selection signal generating circuit 27, so that the decoder 25 generates signals SELD-1-SELD4 for selecting a register block as a bus destination in response to the microinstruction and supplies the same to the corresponding register blocks $20_1$-$20_4$. Then, a bus destination register selecting instruction 21b in the microinstruction 21 is applied to other decoder 26 constituting the selection signal generating circuit 27 and the decoder 26 generates signals SELDa-SELDd for selecting a register as a bus destination in response to the microinstruction and supplies the same in common to respective register blocks. Then, a bus source register block selecting instruction 21c in the microinstruction 21 is applied to other decoder 23 constituting the selection signal generating circuit 27 and the decoder 23 generates signals SELS1-SELS4 for selecting a register block as a bus source in response to the microinstruction and supplies the same to the corresponding register blocks $20_1$-$20_4$. Furthermore, a bus source register selecting instruction 21d in the microinstruction 21 is applied to other decoder 24 constituting the selection signal generating circuit 27, so that the decoder 24 generates signals SELSa-SELSd for selecting a register as a bus source in response to the microinstruction and supplies the same in common to respective register blocks.

A timing generating circuit 22 generates timing signals $\overline{T_{PC}}$, $T_{PC}$, $T_{BS}$, $T_{BD}$, $T_1$ and $T_2$ which will be described later.

Figure 2:
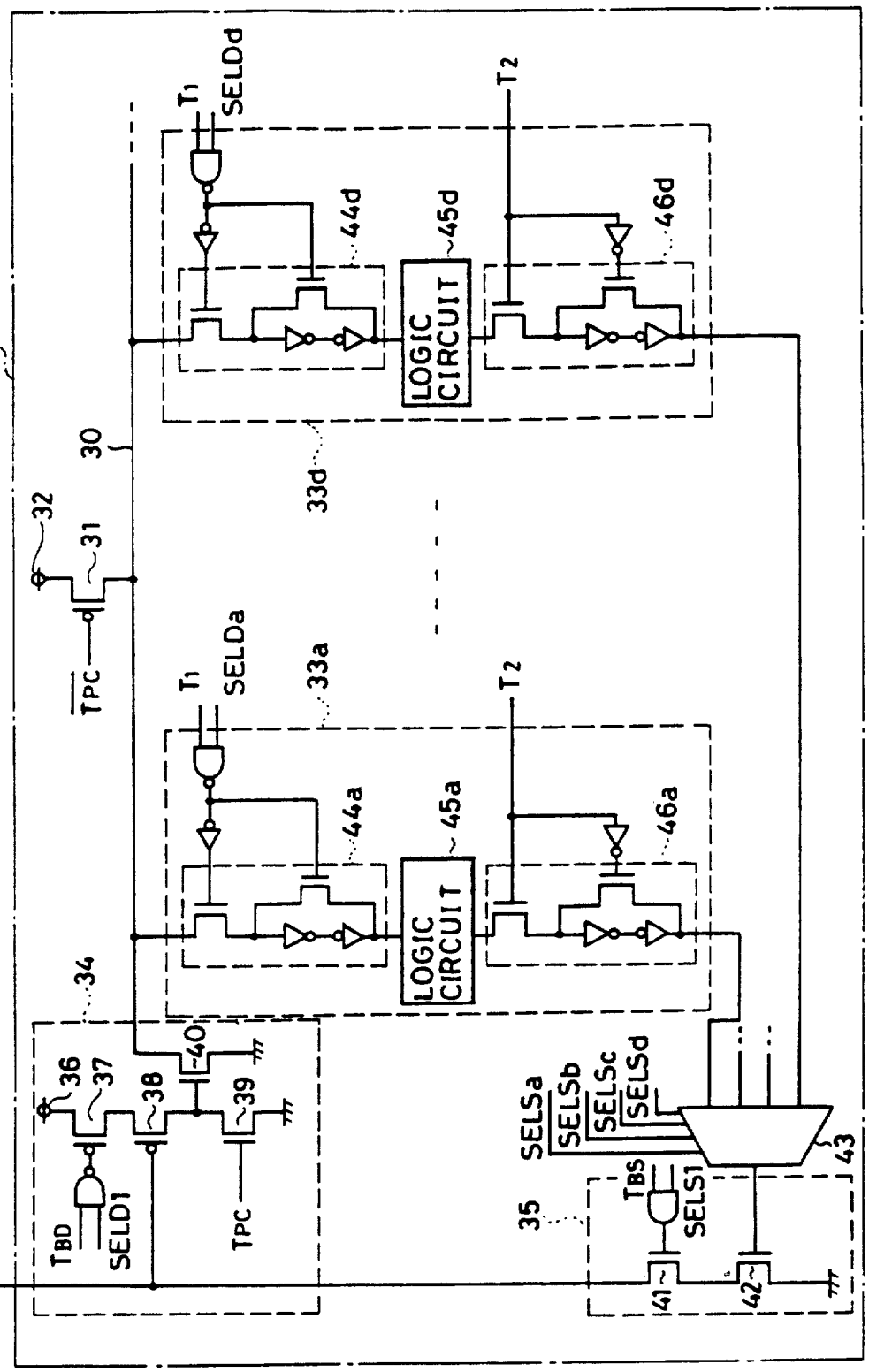
FIG. 2 is a diagram showing in detail a register block shown in FIG. 1.

FIG. 2 is a diagram showing in detail the register block shown in FIG. 1. Since all of the register blocks $20_1$-$20_4$ shown in FIG. 1 have the same structure, a description will be given to a structure of the register block $20_1$ as an example and the other blocks will not be described.

The register block $20_1$ is mainly comprised of a local bus interconnection 30 in the block, a precharging P channel transistor 31, a power supply 32, registers 33a to 33d, a bus driver 34 for local bus interconnection, a bus driver 35 for bus interconnection and a multiplexer 43. Switching of the precharging transistor 31 is controlled by the timing signal $\overline{T_{PC}}$ from the timing generating circuit 9. The local bus interconnection 30 functions as a lower rank bus. In addition, since all the registers 33a–33d have the same structure, description will be given to the contents of the registers 33a and 33d herein.

For example, the register 33a comprises a destination latch 44a, a logic circuit 45a and a source latch 46a. The destination latch 44a is for receiving the data transferred from the source register through the local bus interconnection 30 and an operation thereof is controlled by a logical product of the timing signal $T_1$ from the timing generating circuit 22 and the signal SELDa from the decoder 26. The source latch 46a is for holding the data to be transferred to the destination through the bus interconnection 1 and an operation thereof is controlled by the timing signal $T_2$ from the timing generating circuit 22.

The bus driver 35 for bus interconnection comprises N channel transistors 41 and 42 connected in series between the bus interconnection 1 and the ground, wherein applied to a gate of the transistor 41 is a logical product of the timing signal $T_{BS}$ from the timing generating circuit 22 and the signal SELS1 from the decoder 23 and applied to a gate of the transistor 42 is an output of the multiplexer 43. The multiplexer 43 selects an output of a destination latch of any of the registers 33a–33d and outputs the same in response to the signals SELSa-SELSd from the decoder 24.

The bus driver 34 for local bus interconnection is comprised of P channel transistors 37 and 38 and the N channel transistor 31 connected in series between a power supply 36 and the ground, and an N channel transistor 40 connected between the local bus interconnection 30 and the ground, wherein a gate of the transistor 40 is connected to an interconnection point between the transistors 38 and 39. A logical product of the timing signal $T_{BD}$ from the timing generating circuit 22 and the signal SELD1 from the decoder 25 is applied to a gate of the transistor 37, a gate of the transistor 38 is connected to the bus interconnection 1 and the timing signal $T_{PC}$ from the timing generating circuit 22 is applied to a gate of the transistor 39.

Figure 3:
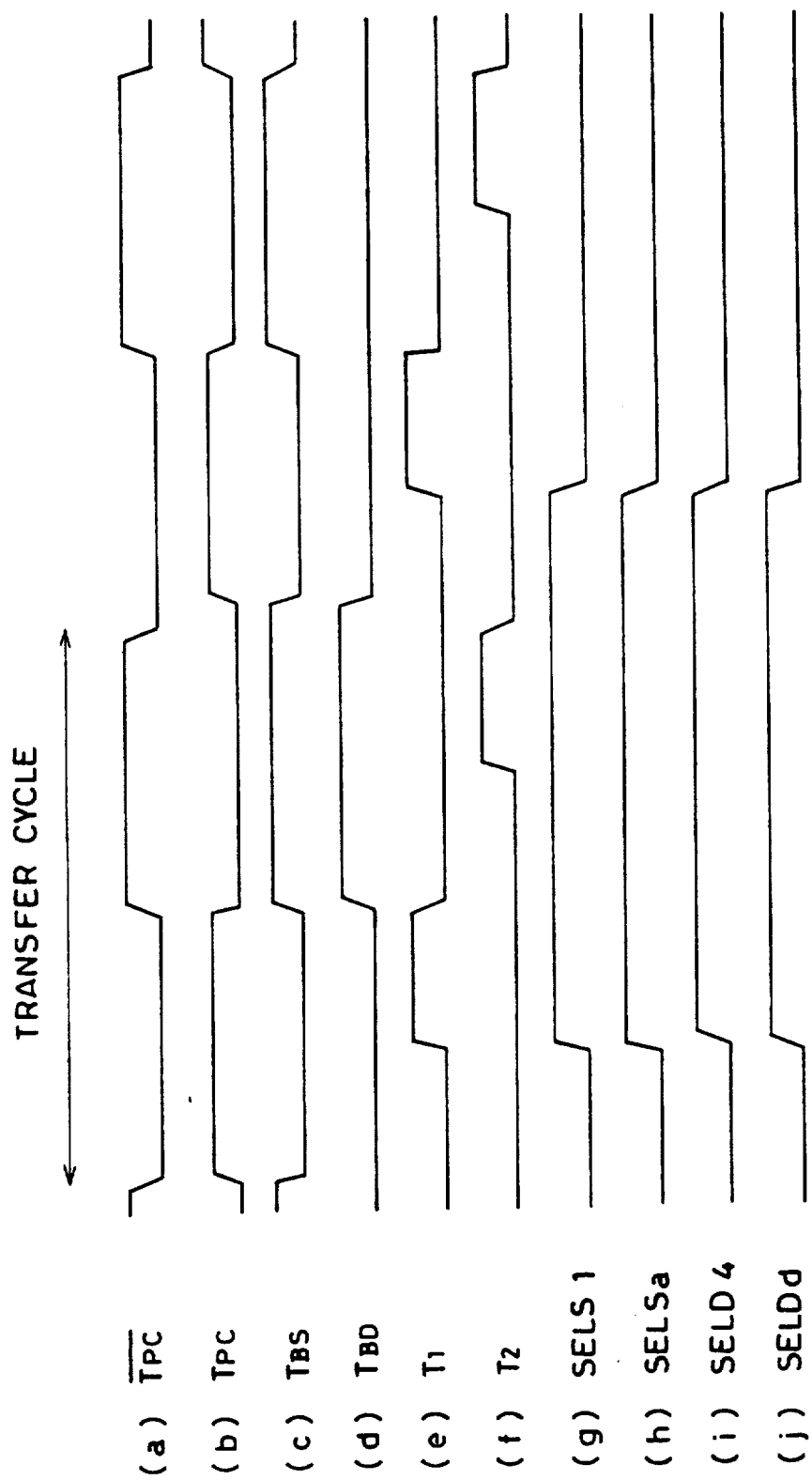
FIG. 3 is a timing chart for explaining an operation of the first embodiment of the present invention.

FIG. 3 is a timing chart for explaining an operation of the embodiment shown in FIGS. 1 and 2.

Now referring to FIGS. 1 through 3, description will be given to an operation of one embodiment of the present invention in case where, for example, the data stored in the latch 46a of the register 33a in the register block 20₁ is transferred to a latch 44d of the register 33d in the register block 20₄.

First, during a period where the timing signal $T_{PC}$ (FIG. 3 (a)) generated from the timing generating circuit 22 is at the "L" level, the precharging transistor 2 for the bus interconnection 1 and the precharging transistor 31 in each block are turned on, thereby causing currents to flow from the power supplies 3 and 32 to the bus interconnection 1 and the local bus interconnection 30 respectively, so that potentials on the bus interconnection 1 and the local bus interconnection 30 attain the "H" level. During this period, the $T_{BS}$ generated from the timing generating circuit 22 remains the "L" level FIG. 3 (c)). Subsequently, when the $T_{PC}$ rises to the "H" level, although the precharging transistors 2 and 31 are turned off, the potentials on the bus interconnection 1 and the local bus interconnection 30 remain at the "H" level (precharging period).

Now considering a case in which the data to be transferred is at the "H" level, a signal held in the latch 46a of the register 33a in the register 20₁ is a signal of the "H" level. In this occasion, since the register 33a is selected as a bus source, the selection signal SELSa supplied form the decoder 24 attains the "H" level (FIG. 3(h)). In response thereto, the multiplexer 43 selected the signal of the "H" level held in the latch 46a of the register 33a to apply the same to a gate of one N channel transistor 42 constituting the bus driver 35 for bus inteconnection. The N channel transistor 42 is turned on in response thereto.

In addition, in this case, sine the register block 20₁ is selected as a bus source, the selection signal SELS1 supplied from the decoder 23 attain the "H" level (FIG. 3(g)). Accordingly, when the $T_{PC}$ rises to the "H" level followed by the rise of the $T_{BS}$ to the "H" level (FIG, 3 (c)), the other N channel transistor 41 constituting the bus driver 35 for bus interconnection is turned on at this time point, so that the bus interconnection 1 is connected to the ground potential, whereby the potential on the bus interconnection 1 is lowered to the "L" level.

On the other hand, since the register block 20₄ is selected as a bus destination, the selection signal SELD4 supplied from the decoder 25 attains the "H" level (FIG. 3 (i)). At this time, when the $\overline{T_{PC}}$ from the timing generating circuit 22 falls to the "L" level (FIG. 3 (b)) and the $T_{BD}$ rises to the "H" level, the P channel transistor 37 in the register block 20 is turned on and the N channel transistor 39 is turned off. Since the potential on the bus interconnection 1 is at the "L" level, the P channel transistor 38 is turned on and therefore current flows from the power supply 36 through the transistors 37 and 38, turning on the N channel transistor 40. As a result, the local bus interconnection 30 in the register block 20₄ is connected to the ground potential, so that the potential on the local bus interconnection 30 is lowered to "L" level. On this occasion, since the selection signals SELD1-SELD3 to the other register blocks 20₁-20₃ from the decoder 25 remain at the "L" level, all the local bus interconnections in these register blocks remain at the "H" level, so that electricity of the no local bus interconnections is discharged.

Subsequently, the register 33d in the register block 20₄ is selected as a bus destination, so that the selection signal SELDd from the decoder 27 attains the "H" level (FIG. 3 (j)) Accordingly, the latch 44d of the register 33d operates in response to the timing signal $T_1$ from the timing generating circuit 22, whereby the inversion data is taken from the local bus interconnection 30 to the latch 44d.

On the other hand, when the data to be transferred is at the "L" level, the output of the multiplexer 43 in the register block 20₁ attains the "L" level, so that the N channel transistor 42 is not turned on. Accordingly, no electric charge on the bus interconnection 1 is discharged, whereby the potential thereon remains at the "H" level. Accordingly, the potential on the local bus interconnection 30 in the register block 20₄ also remains at the "H" level, so that the inversion data is taken from the local bus interconnection 30 to the latch 44d of the register 33d in response to the timing signal.

Now considering a decoding of the microinstruction in the above described embodiments.

In the embodiment of FIG. 1, four register blocks are provided, each comprising four registers, so that the total number of the registers is 16. Accordingly, 4 bits is required for each of a microinstruction field for selecting a bus destination register (referred to as selection field hereinafter) and a selection field for selecting a bus source register. In case of simply decoding these selection fields, two of 4-bit decoding circuits are needed and the number of signal lines from the decoding circuits will be $16 \times 2 = 32$.

Now considering a case in which the number of registers is limited to the power of 2. For example, in case of the embodiment of FIG. 1, since the number of blocks is four ($2^2$) and the number of registers in each block is four ($2^2$), the two higher order bits of the 4-bit selection field will be allotted to a block selection and the two lower order bits thereof will be allotted to a register selection.

More specifically, in order to decode the selection signals SELS1-SELS4 and SELD1-SELD4 for the register blocks, two 2-bit decoding circuits are needed and also in order to decode the selection signals SELSa-SELSd and SELDa-SELDd for the registers, two 2-bit decoding circuits are needed. As a result, the number of the signal lines will be $4 \times 4 = 16$, so that it will be possible to more miniaturize a decoding circuit and reduce the number of signal lines than in case of a simple decoding as described above. If it is assumed that the number of blocks is $2^m$ and the number of registers in each block is $2^n$ (m and n are positive integers), it is preferable that m and n should be set as close as possible to each other but it is not necessarily required that they should be just the same number. For example, it is possible to set m and n to be 1 and 3, respectively.

While in the above mentioned embodiment, a description has been made on a case where a main bus as a higher rank bus and a plurality of local buses having the same rank as lower rank buses are provided, the present invention is applicable to a case where a main bus as a higher rank bus and a plurality of ranks of local buses (i.e. first rank local buses, second rank local buses , . . . , and n th rank local buses) are provided.

As the foregoing, according to the present invention, since the bus has a hierarchical structure such that electricity on lower rank buses are selectively discharged, electricity on the lower rank buses except for the destination are not discharged to reduce a time period required for discharging electricity on a bus and a power consumption. In addition, by limiting the number of registers coupled to the lower rank buses to the power of 2, the decoding circuit of the microinstruction can be simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A precharge type bus circuit for transferring data between a device connected to a main bus and a selected one of a plurality of registries, including:
   a higher rank bus forming the main bus,
   two lower rank buses connected to said higher rank bus through a first switching means responsive to a register block select signal,
   two register means each including a pair of registers connected to a respective one of said lower rank buses through a second switching means responsive to a register select signal, and
   a decoder means including means or providing said register block select signal and means for providing said register select signal; wherein
   said register block select signal includes source block select signals and destination block select signals and said register select signal includes source register signals and destination register signals, and said decoder means includes:
   source block decoder means responsive to a microinstruction for providing said source block select signals;
   source register decoder means responsive to said microinstruction for provided said source register signals;
   destination block decoder means responsive to said microinstruction for providing said destination block select signals; and
   destination register decoder means responsive to said microinstruction for providing said destination register signals,
   said first switching means responsive to said source block select signal for selectively connecting an output node of one of said lower rank buses to said higher rank bus and responsive to said destination block select signals for connecting an input node of one of said lower rang buses to said higher ranked bus, and
   said second switching means responsive to said source register signals for selectively connecting an output not of one of each pair of registers to a respective one of said lower rank buses and responsive to said destination register signals for selectively connecting an input node of one of each pair of registers to a respective one of said lower rank buses.

2. A precharge type bus circuit according to claim 1 further including a microinstruction register for storing said microinstruction and supplying respective address data to said source block decoder means, source register decoder means, destination block decoder means and said destination register decoder means.

* * * * *